United States Patent [19]

Smoot, III et al.

[11] Patent Number: 4,643,245
[45] Date of Patent: Feb. 17, 1987

[54] SYSTEM COOLER FOR A COMPUTER

[76] Inventors: Edmond Smoot, III; George Spector, both of 233 Broadway, Rm. 3615, New York, N.Y. 10007

[21] Appl. No.: 697,074

[22] Filed: Jan. 31, 1985

[51] Int. Cl.⁴ .......................... F24H 3/00; H02B 1/00
[52] U.S. Cl. ..................................... 165/47; 361/384; 165/121
[58] Field of Search ................... 165/47, 121; 361/384

[56] References Cited

U.S. PATENT DOCUMENTS

| | | | |
|---|---|---|---|
| 2,942,856 | 6/1960 | Woodward et al. | 165/47 |
| 3,006,982 | 10/1961 | Krantz | 165/47 |
| 3,298,195 | 1/1967 | Raskhodoff | 165/47 |
| 3,467,892 | 9/1969 | Sprude et al. | 361/384 |
| 3,962,608 | 6/1976 | Forster et al. | 361/384 |
| 3,967,874 | 7/1976 | Calabro | 361/384 |
| 4,084,213 | 4/1978 | Kirchner et al. | 361/384 |
| 4,126,269 | 11/1978 | Bruges | 361/384 |
| 4,383,286 | 5/1983 | Hicks | 361/384 |
| 4,399,485 | 8/1983 | Wright et al. | 361/384 |
| 4,513,351 | 4/1985 | Davis et al. | 361/384 |

FOREIGN PATENT DOCUMENTS

| | | | |
|---|---|---|---|
| 1063217 | 9/1979 | Canada | 361/384 |
| 2211268 | 9/1973 | Fed. Rep. of Germany | 361/384 |
| 2138376 | 6/1977 | Fed. Rep. of Germany | 361/384 |
| 221619 | 6/1962 | Netherlands | 361/384 |
| 737922 | 10/1955 | United Kingdom | 361/384 |
| 1561689 | 2/1980 | United Kingdom | 361/384 |

Primary Examiner—William R. Cline
Assistant Examiner—John K. Ford

[57] ABSTRACT

A cooling system for a computer that has a circuit board provided whereby the computer can be placed thereon allowing air blown from a blower motor to flow across a base member up through the computer thus cooling the circuit board.

3 Claims, 6 Drawing Figures

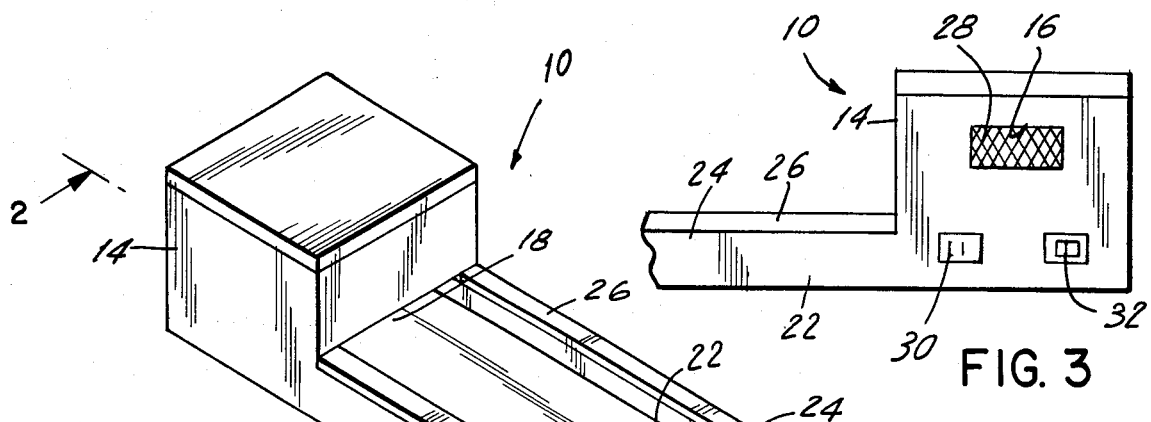
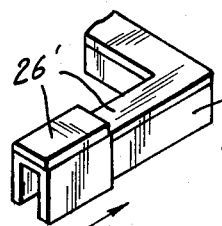
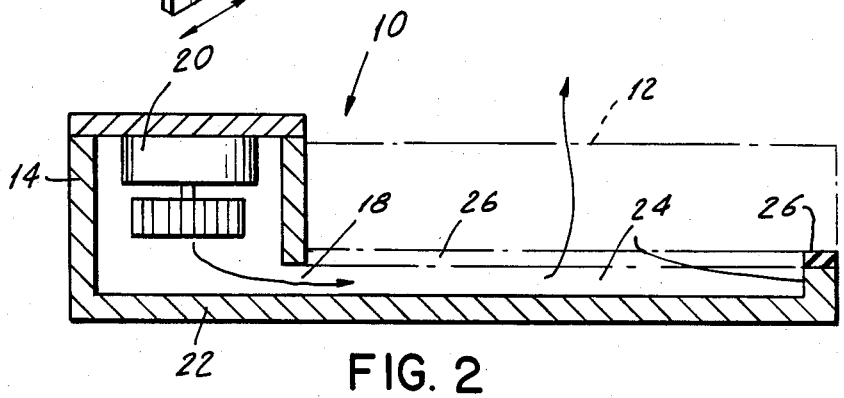
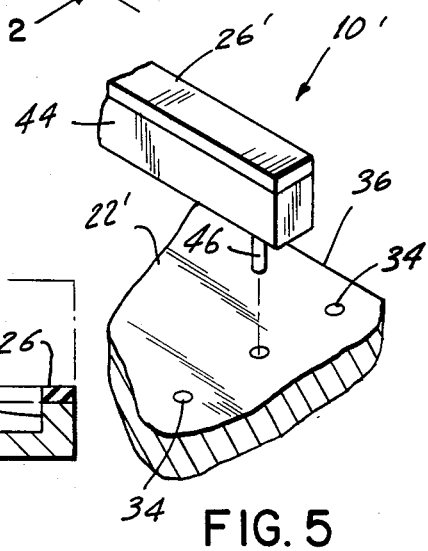
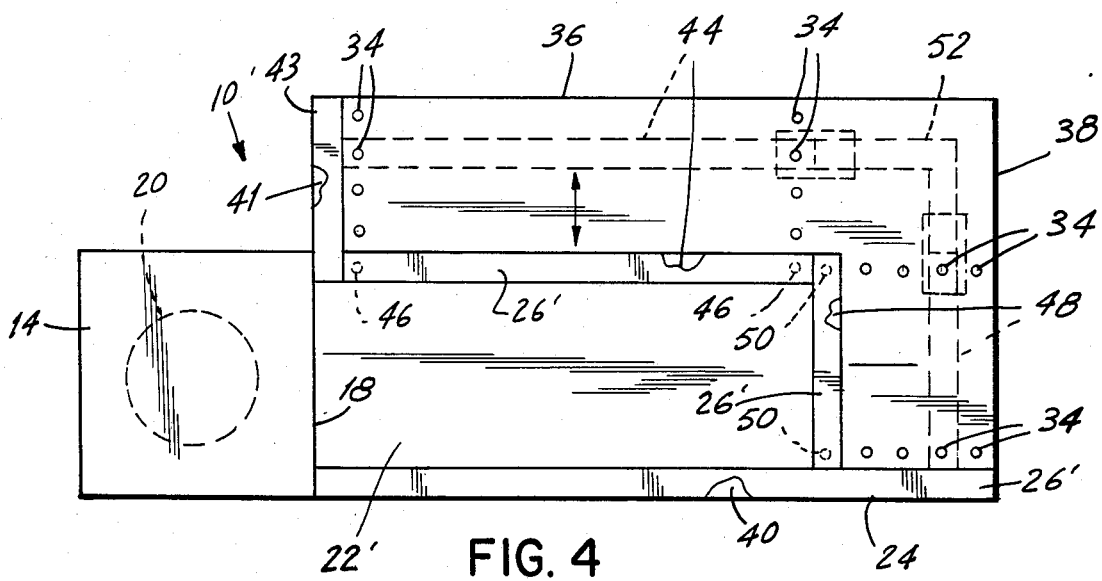

SYSTEM COOLER FOR A COMPUTER

BACKGROUND OF THE INVENTION

The instant invention relates generally to cooling devices for electrical equipment and more specifically it relates to a cooling system for a computer.

Numerous cooling devices for electrical equipment have been provided in prior art that are adapted to prevent overheating. For example, U.S. Pat. Nos. 3,039,377; 3,962,608 and 4,383,286 all are illustrative of such prior art. While these units may be suitable for the particular purpose to which they address, they would not be as suitable for the purposes of the present invention as heretofore described.

SUMMARY OF THE INVENTION

A principal object of the present invention is to provide a cooling system for a computer that will cool down component parts, help eliminate the overheating of the computer and extend the life of the circuit board component parts.

Another object is to provide a cooling system for a computer that is a great advantage for those individuals who write programs, play computer games, are members of computer users group, use telecommunication service and use computer control devices.

An additional object is to provide a cooling system for a computer that can be modified to work with other types of computer peripherals.

A further object is to provide a cooling system for a computer that is simple and easy to use.

A still further object is to provide a cooling system for a computer that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention.

FIG. 2 is a cross sectional view taken along line 2—2 in FIG. 1.

FIG. 3 is a partial rear view thereof.

FIG. 4 is a top plan view of a modification showing the base able to receive various size computers for cooling.

FIG. 5 is an exploded perspective view with parts broken away showing one of the side molding being adjustable.

FIG. 6 is a perspective view with parts broken away of the adjustable corner molding used in FIG. 4.

DETAILED DESCRIPTION OF THE PREFERRED EMBODIMENTS

Turning now descriptively to the drawings, in which similar reference characters denote similar elements throughout the several views, FIGS. 1 through 3 illustrate a cooling system 10 for a computer 12 shown in phantom that has a circuit board (not shown). The cooling system 10 contains a blower box 14 that has an air intake port 16 and an air exit port 18 with blower motor 20 mounted within the blower box 14. An elongated flat base member 22 extends from side of the blower box 14 adjacent the exit port 18 while a side molding 24 is formed around edge of the base member 22. Foam insulation 26 is affixed to top surface of the side molding 24. The computer 12 can be placed thereon allowing air blown from the blower motor 20 to flow across the base member 22 up through the computer 12 thus cooling the circuit board.

The blower box 14 further contains an air filter 28 mounted within the air intake port 16, an electric cord outlet 30 electrically connected to the blower motor 20 and a switch 32 to manually turn the blower motor 20 on and off.

FIGS. 4 through 6 illustrates a modified cooling system 10'. The base member 22' is wide and has a plurality of apertures 34 near rear edge 36 and free edge 38 thereof. Two fixed side moldings are provided. One being 40 is formed on the front edge of the base member 22 and other 41 is formed on wide edge 43 of the base member 22' adjacent the blower box 14. A movable rear side molding 44 with a U-shaped end is provided and has downwardly extending pins 46 to engage with the apertures 34 in different positions near the rear edge 36 of the base member 22'. A movable free side molding 48 with a U-shaped end is also provided and has downwardly extending pins 50 to engage with the apertures 34 in different positions near the free edge 38 of the base member 22'. An adjustable corner molding 52 as best seen in FIG. 6, is slidingly received within U-shaped ends of movable rear side molding 44 and the movable free side molding 48 at different positions (shown in dotted lines).

Foam insulation 26' is affixed to top surface of the fixed side moldings 40, 41, the movable rear side molding 44, the movable free side molding 48 and adjustable corner molding 52 whereby a different size computer can be placed thereon allowing air blown from the blower motor 20 to flow across the base member 22' up through the computer thus cooling the circuit board.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A cooling system for a computer having a circuit board which comprises:
   (a) a blower box having an air intake port and an air exit port;
   (b) a blower with motor mounted within said blower box;
   (c) an elongated and wide flat base member extending from a side of said blower box adjacent said exit port, said base member having a plurality of apertures near lateral edges thereof;
   (d) two fixed side moldings, one formed on a front edge of said base member and other formed on a wide edge of said base member adjacent said blower box;
   (e) a moveable rear molding having downwardly extending pins to engage with said apertures in different positions near a rear edge of said base member;

(f) a moveable lateral molding perpendicular to said rear molding having downwardly extending pins to engage with other of said apertures in different positions near one of said lateral edges of said base member;

(g) a moveable corner molding having means to engage with said moveable rear molding and said moveable lateral molding in different positions, whereby different size computers can be mounted on said base member for cooling purposes.

2. A cooling system as recited in claim 1, wherein said blower box further comprises:
   (a) an air filter mounted within said air intake port;
   (b) an electric cord outlet electrically connected to said blower motor; and
   (c) a switch to manually turn said blower motor on and off.

3. A cooling system as in claim 1, wherein said moldings have U-shaped ends which removeably receive the corner molding therein.

* * * * *